United States Patent [19]

Papst et al.

[11] Patent Number: 5,579,113

[45] Date of Patent: Nov. 26, 1996

[54] APPARATUS FOR TESTING MATRIXES

[75] Inventors: Gerhard Papst; Klaus Schiffer, both of Elbigenalp, Austria

[73] Assignee: Koch Digitaldisc Gesellschaft m.b.h. & Co. KG., Elbigenalp, Austria

[21] Appl. No.: 402,516

[22] Filed: Mar. 10, 1995

[30] Foreign Application Priority Data

Mar. 15, 1994 [AT] Austria ......................................... 543/94

[51] Int. Cl.⁶ .......................... G01N 21/84; G01N 21/01; G11B 3/90; G11B 27/36
[52] U.S. Cl. ............................ 356/426; 356/244; 369/53; 369/54; 369/58
[58] Field of Search ................................... 369/53, 54, 58; 356/244, 426

[56] References Cited

U.S. PATENT DOCUMENTS 4,868,805  9/1989  Hanami et al. ............................ 369/53
5,350,923  9/1994  Bassignana et al. ...................... 356/244

FOREIGN PATENT DOCUMENTS

| 0094273 | 11/1983 | European Pat. Off. . |
| 0204378 | 12/1986 | European Pat. Off. . |
| 0255088 | 2/1988 | European Pat. Off. . |
| 0495281 | 7/1992 | European Pat. Off. . |
| 2527084 | 1/1976 | Germany . |
| 2642342 | 4/1977 | Germany . |

Primary Examiner—Frank Gonzalez
Assistant Examiner—Jason D. Eisenberg
Attorney, Agent, or Firm—Lorusso & Loud

[57] ABSTRACT

Apparatus for testing matrixes for manufacturing optical storage media, with a holding device for the matrix displaceable in a rotary manner and an opto-electronic sensing system for reading the data stored on the matrix, where between the matrix (3) and the sensing system (4) a cover (6) configured as a rigid, transparent plate moved together with the holding device (2) and the matrix (3) is provided.

23 Claims, 12 Drawing Sheets

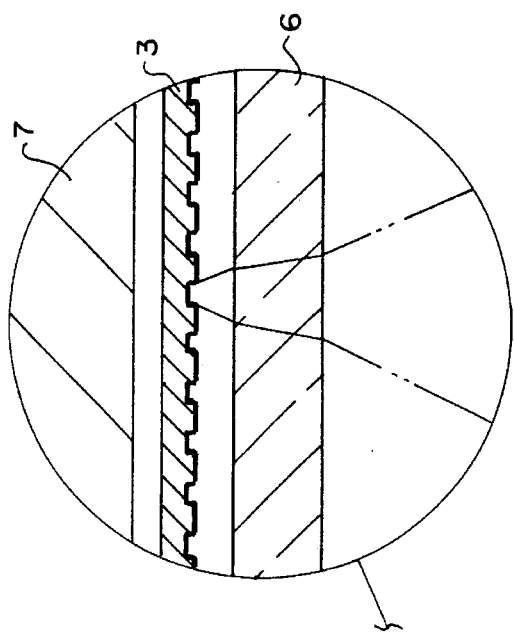
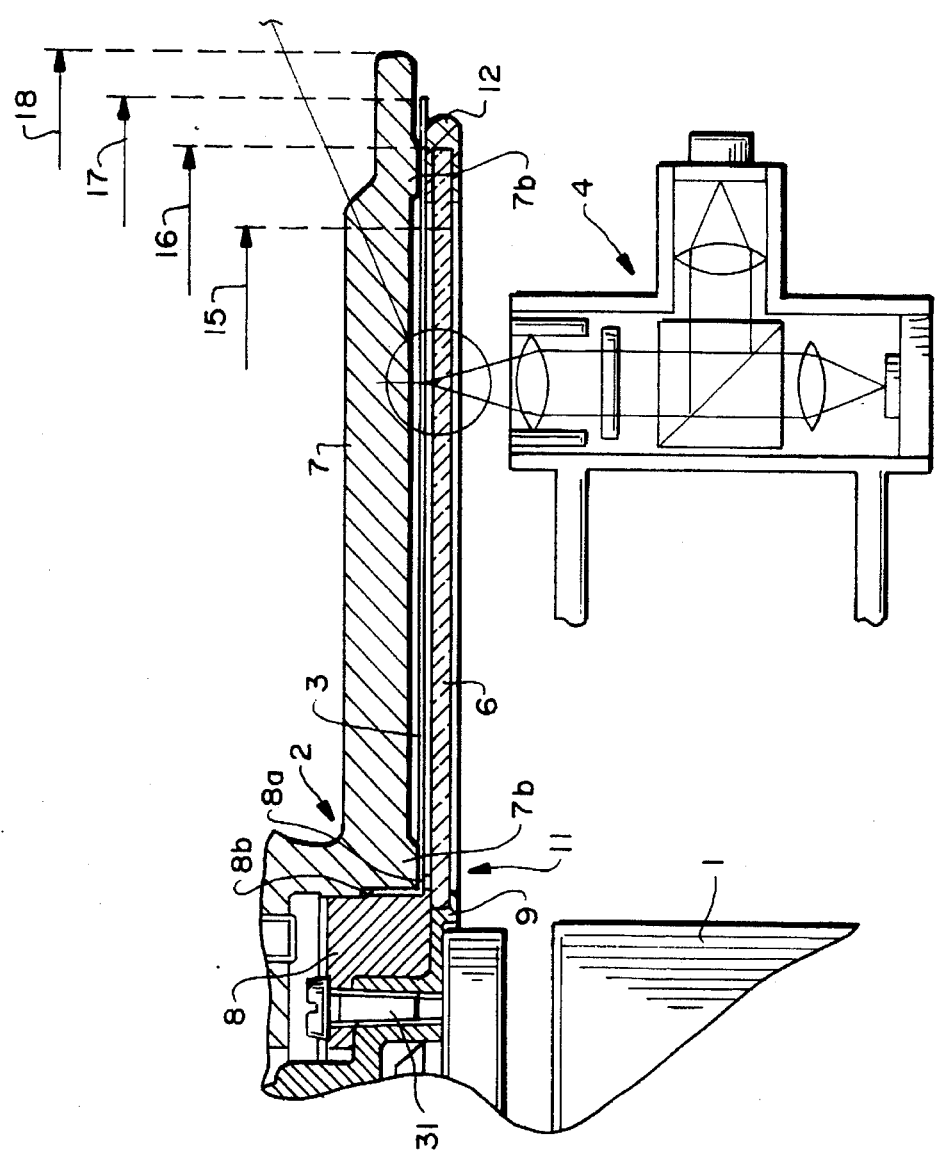
FIG. 2b
FIG. 2a

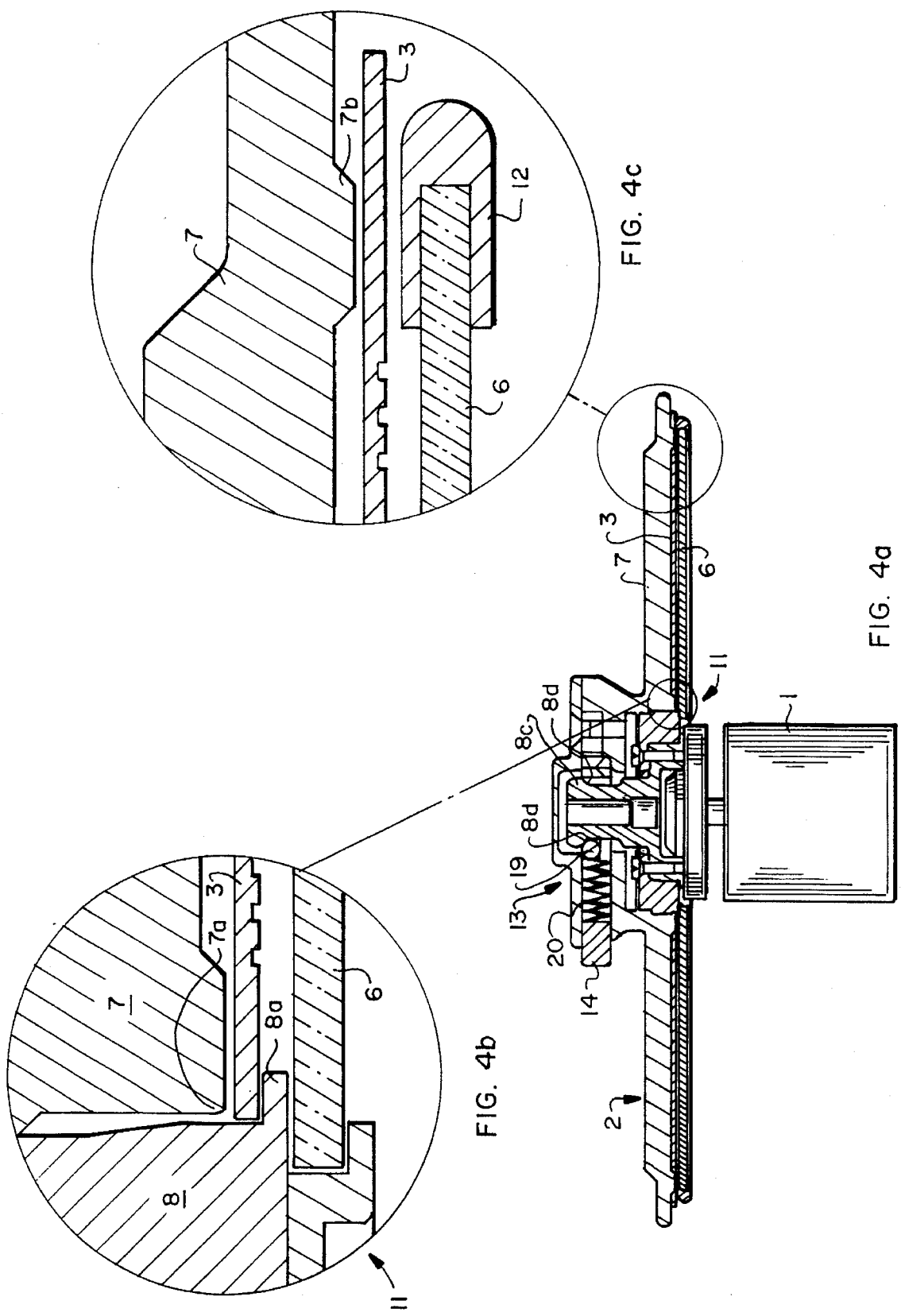

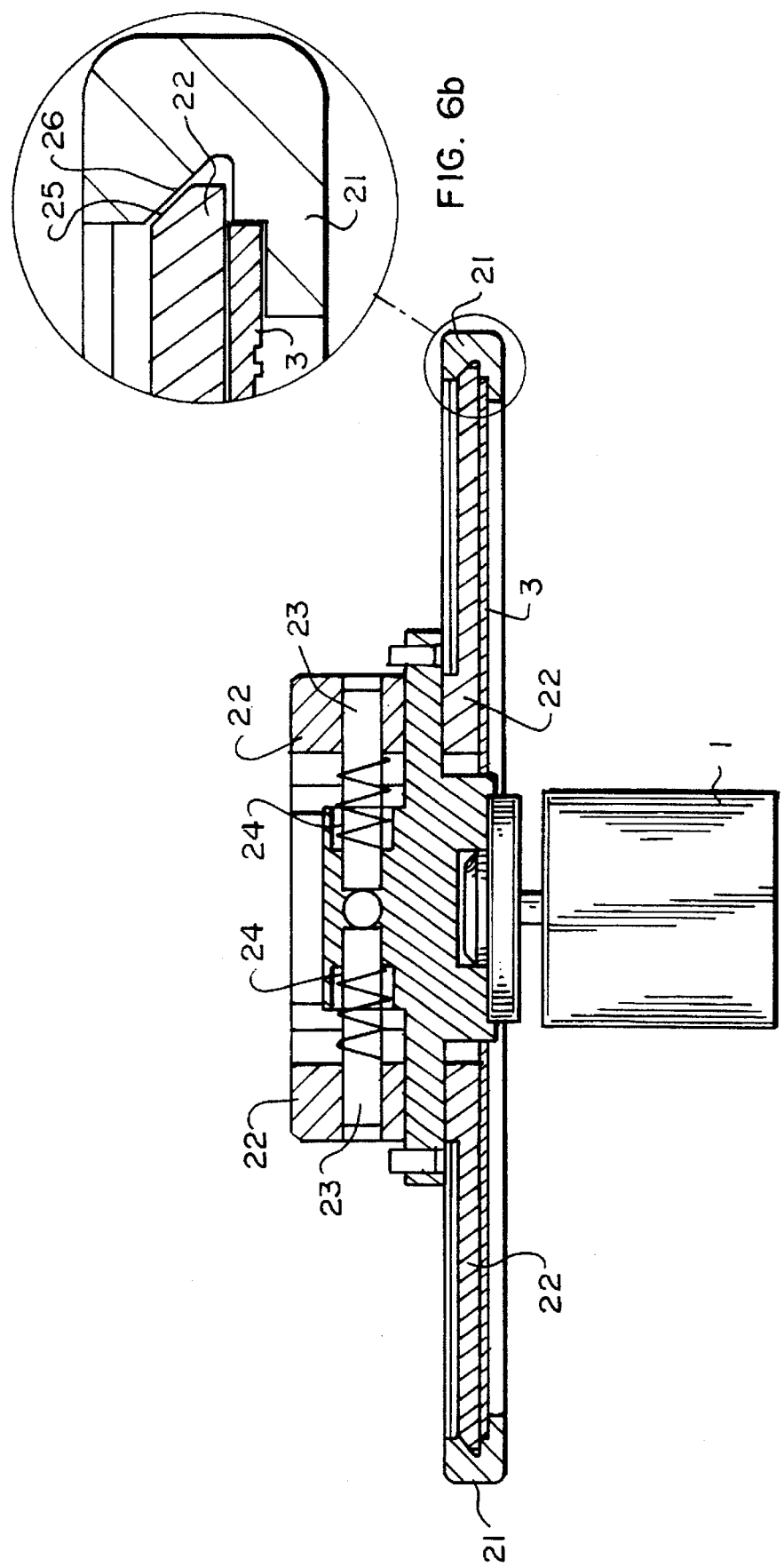

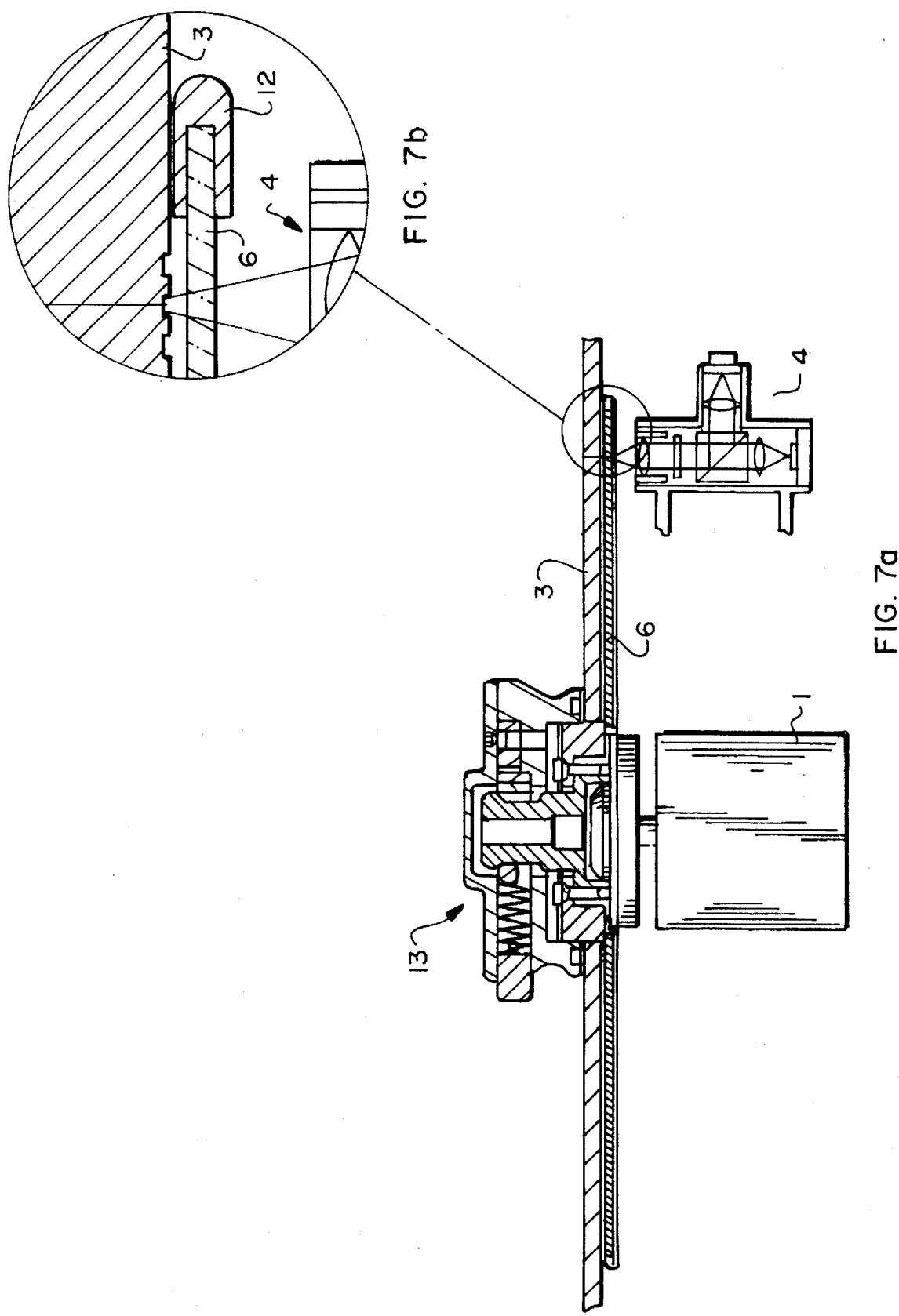

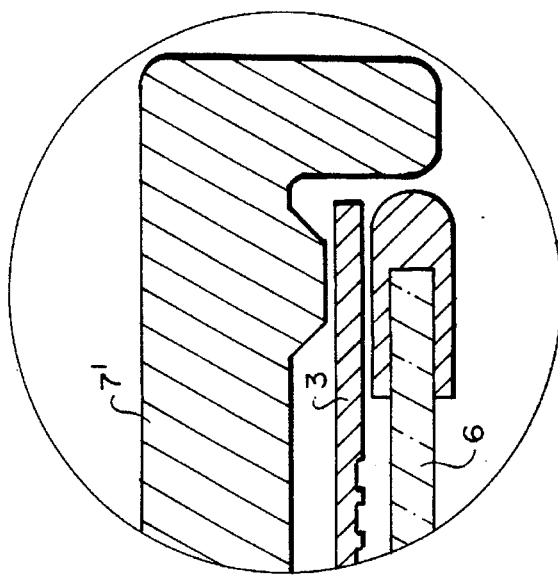
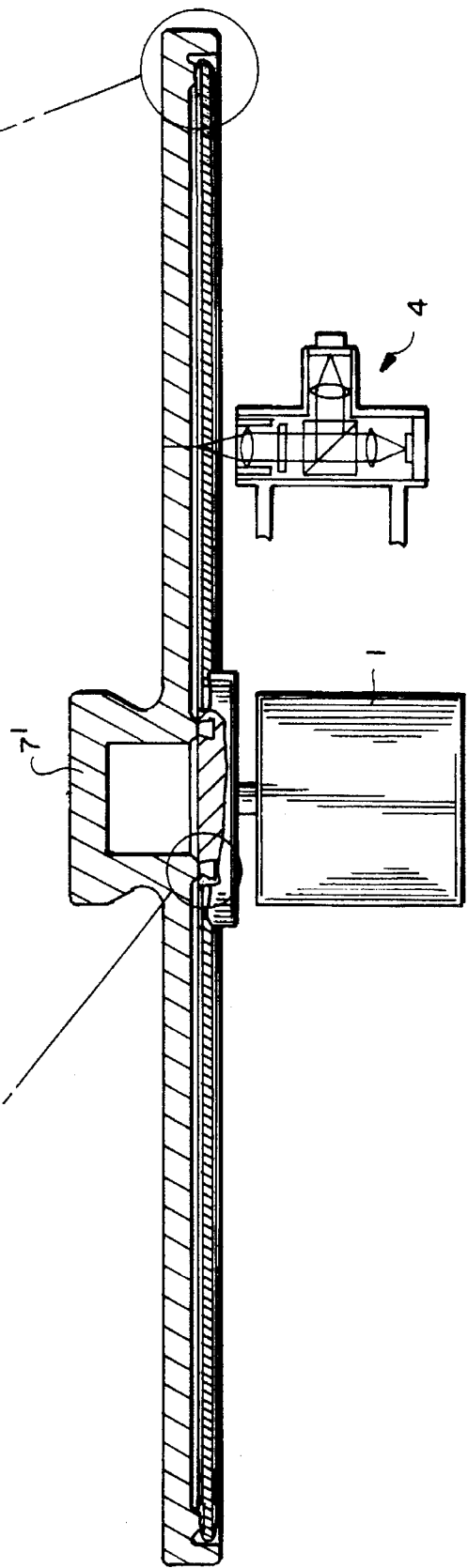
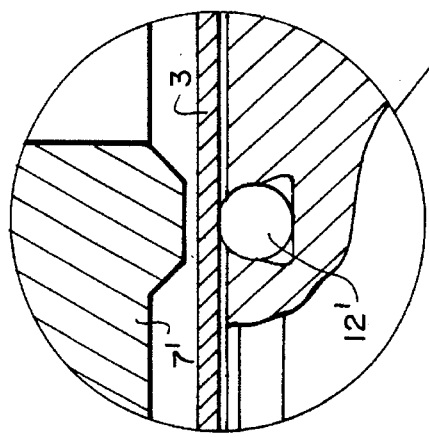
FIG. 8c
FIG. 8a
FIG. 8b

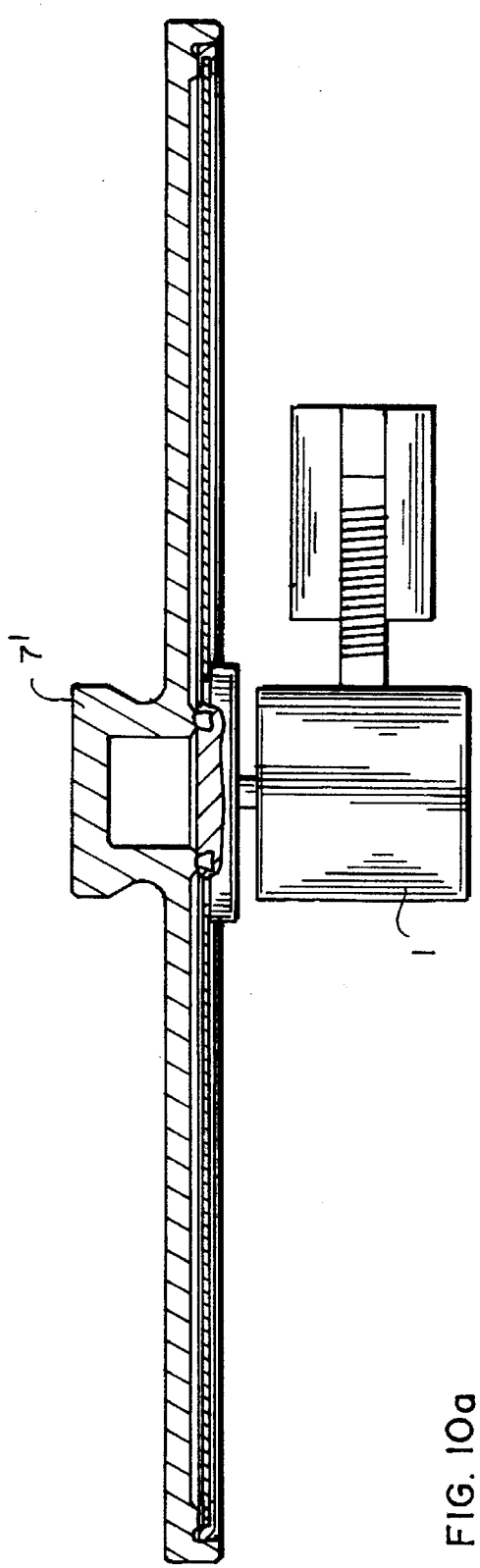
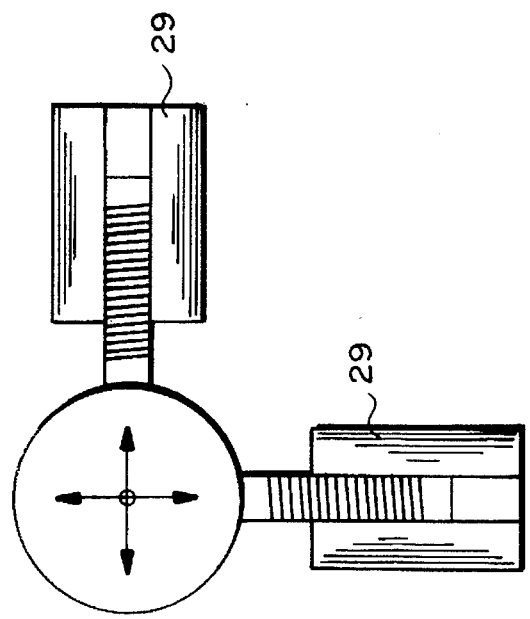
FIG. 10a
FIG. 10b

APPARATUS FOR TESTING MATRIXES

FIELD OF THE INVENTION

The invention relates to an apparatus for testing matrixes for the manufacture of optical storage media, with a holding device for the matrix displaceable by rotary movement and an opto-electrical sensing system for reading the signals stored on the matrix.

Description of the Prior Art

So-called "masters", "fathers", "mothers", "sons" or "matrixes" (hereinafter referred to only as "matrixes" for reasons of simplicity) are used for the reproduction of optical storage media, media such as compact discs, CD-ROM, CD-XA, CD-I, recordable CDs, MiniDisc and other media based on the CD format, once-writable optical media, multi-writable optical media such as opto-magnet media, and other optically readable media based on comparable principles. These matrixes are parts made from metal or from glass or from plastics which are manufactured or reproduced by means of exposure to light, etching, plasma etching, vacuum metal vapour deposition, partial vapour deposition or electro-chemically (galvanically). They, as well as the end products (optical storage media) produced therefrom contain mechanical structures ("pits") which either themselves represent the information to be read (in the pre-recorded embodiments of these media), or are control or synchronisation information for a later writing process (in once or multi writable embodiments of these media).

These structures ("pits") are read optically, wherein the reading is carried out by modulation of a laser beam. The modulation is carried out, for example, by reflection of this laser beam on a transitional surface, by interference at various levels of the structures, by scattering on the structures and by refraction. The electrical signals, information and measured values which can be derived from these structures (data) are also referred to hereinafter as "signals". In order to comply with international quality standards, limiting values are sometimes specified for the end-product structures and the signals derived.

Either further matrixes or indeed the end-product (the optical medium) is manufactured from these matrixes by moulding the mechanical structures (pits) by means of electro-chemical (galvanic) processes or by means of moulding within the material (substrate) of the end-product (plastics or glass) itself by means of injection moulding, embossing or injection embossing, or similar processes.

In order to prevent the duplication of faulty end-products due to faulty matrixes, these matrixes are tested, before duplication, with respect to different specific signals. For this, particular processes and devices are required which can recognise the differences between the reading process in the end-product, which is generally carried out through the support material, and the reading process when reading the master or the matrix, which is carried out in the atmosphere. In addition, particularly in the case of the matrix, the different mechanical properties have to be taken into account, wherein the end-product is usually very mechanically stable because of the thickness of its material (the thickness of material in a CD is for example 1.2 mm), whereas in the case of matrixes (a matrix is only 0.3 mm thick) many strong undulations and bends can occur when it is not held flat in a special device.

The unmodified measured values and signals based on sensing of the matrix do not correspond at all to the relevant and specified results of the end-product.

Firstly, the subsequent production processes, in particular the plastics injection moulding process, affect the mechanical structures (data) by means of thermal effects (shrinkage) and thereby the reading of the signals, and the measuring process therefore has to take into account and eliminate these effects.

Furthermore, the measurement of a matrix is done at the transition surface between air/gas or air/metal and the measurement of the end-product is at the transition surface between glass/metal or glass/air or plastics/metal. As the wave-length of the reading laser light has a substantial effect on different signals because of the interference effects underlying the reading process, and the wave-length in plastics or glass is significantly different to the wave length in air, this effect should also be taken into account by means of a process during measurement.

Known processes and devices of this type simulate the different optical behaviour (the "optical path") through a glass or plastics disc which is stuck directly onto the sensing system or attached thereto. This method firstly burdens the sensing system mechanically because of the additional mass. Further, the sensitive sensing system is easily damaged because of the necessary cleaning of this disc. Additionally, the sensitive surface of the matrix is unprotected during manipulation and measurement.

Because of this, the surface of the matrix can easily be damaged or the measurement is affected by dust. The effects of the subsequent production processes or the differences in wave-lengths is not taken into account at all by the existing measurement systems.

SUMMARY OF THE INVENTION

The object of the invention is to provide an apparatus of the type described in the introduction which avoids the disadvantages described of the existing processes and devices, and provides rapid, reliable testing. This is solved according to the invention in that between the matrix and the sensing system a cover is provided which is moved together with the holding device and the matrix and configured as a rigid transparent plate.

In the apparatus described and the process underlying this apparatus, the sensing system for reading the structures (data) is not mechanically burdened at all by any later additions, the matrix is protected from contamination or damage by means of the cover during manipulation and measurement, cleaning is non-critical and the measurement results from the matrix can be adjusted to the respective subsequent production process.

Any known sensing system with a drive and optical read-out system can be used as the sensing system, without any particular mechanical or optical adaptation.

In the apparatus according to the invention the matrix holding device together with the cover can reproduce the optical path, ensure the planarity of the matrix and protect it from contamination or damage.

This apparatus is preferably composed of a lower part for receiving and centring the matrix, and for the reproduction of the optical path through the transparent cover, as well as for protection of the matrix, and an upper part which is a gripping and compressing part which holds the matrix flat.

To adapt the optical path, a transparent plate of glass or plastics is preferably used as a cover, which is not connected to the sensing system, but is configured advantageously as a support of the matrix. The thickness and the optical properties of this transparent plate are set out so that they reproduce as far as is necessary the optical properties of the end product. In this way during the measuring process the plate is not connected to the sensing system, but instead to the matrix or its holding device, and moves with the matrix.

As this transparent plate is firmly fixed to the matrix after assembly of the holding device, it also serves as absolute protection against damage or contamination. When glass is used as the transparent material, the hardened surface of the glass plate makes possible simple cleaning when required, or when necessary it can easily be replaced.

Further advantages and details of the invention will be described in more detail with the aid of the following descriptions of the drawings.

BRIEF DESCRIPTION OF THE DRAWINGS

FIG. 2a shows a section through a part of the embodiment shown in FIG. 2.

FIG. 2b shows an enlarged section of FIG. 2a.

FIG. 4 shows a section through a further embodiment of the apparatus according to the invention, wherein two areas are shown enlarged.

FIG. 6 shows an embodiment with a one-handedly operable rapid fastening which is also suitable for testing apparatuses for matrixes without a transparent cover.

FIG. 7 shows a further embodiment of an apparatus according to the invention with a glass matrix.

FIG. 8 shows a section through an embodiment for matrixes without a central hole, wherein again tow areas are shown enlarged.

FIG. 10 shows an embodiment for a matrix without a central hole which can be introduced in two directions perpendicular with respect to one another during driving.

DETAILED DESCRIPTION OF THE PREFERRED EMBODIMENTS

Figure 1A:
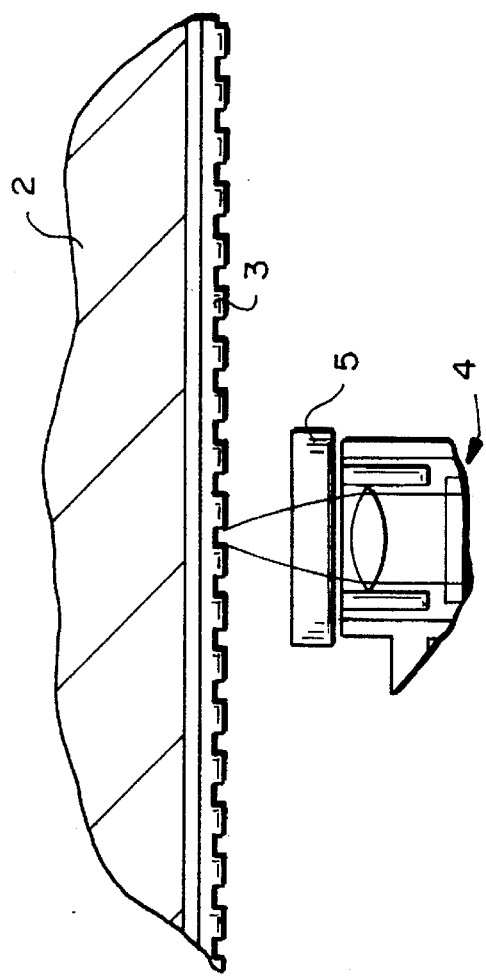
FIGS. 1–1a show an apparatus for testing matrixes according to the state of the art.
Figure 1:
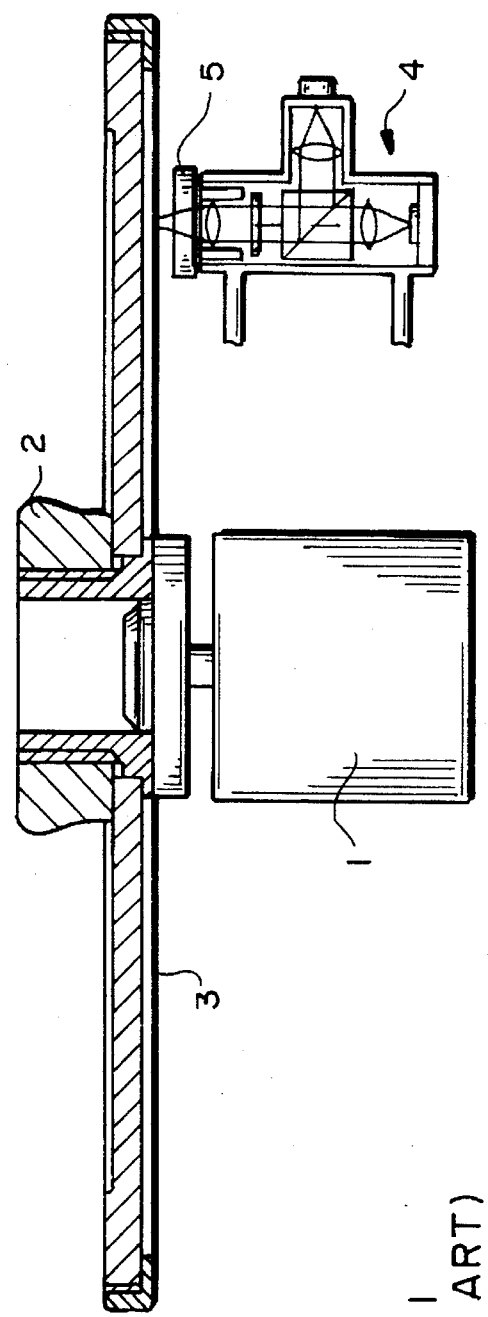

The apparatus for testing matrixes for the manufacture of optical storage media shown in FIGS. 1 and 1a is provided with a holding device 2 for the matrixes 3 displaced in a rotary movement by means of a drive 1. An opto-electronic sensing system 4 serves to read the data stored on the matrix from a compensating disc 5 with a refractive index different to the refractive index of air which is arranged directly on the opto-electronic sensing system 4.

Figure 2:
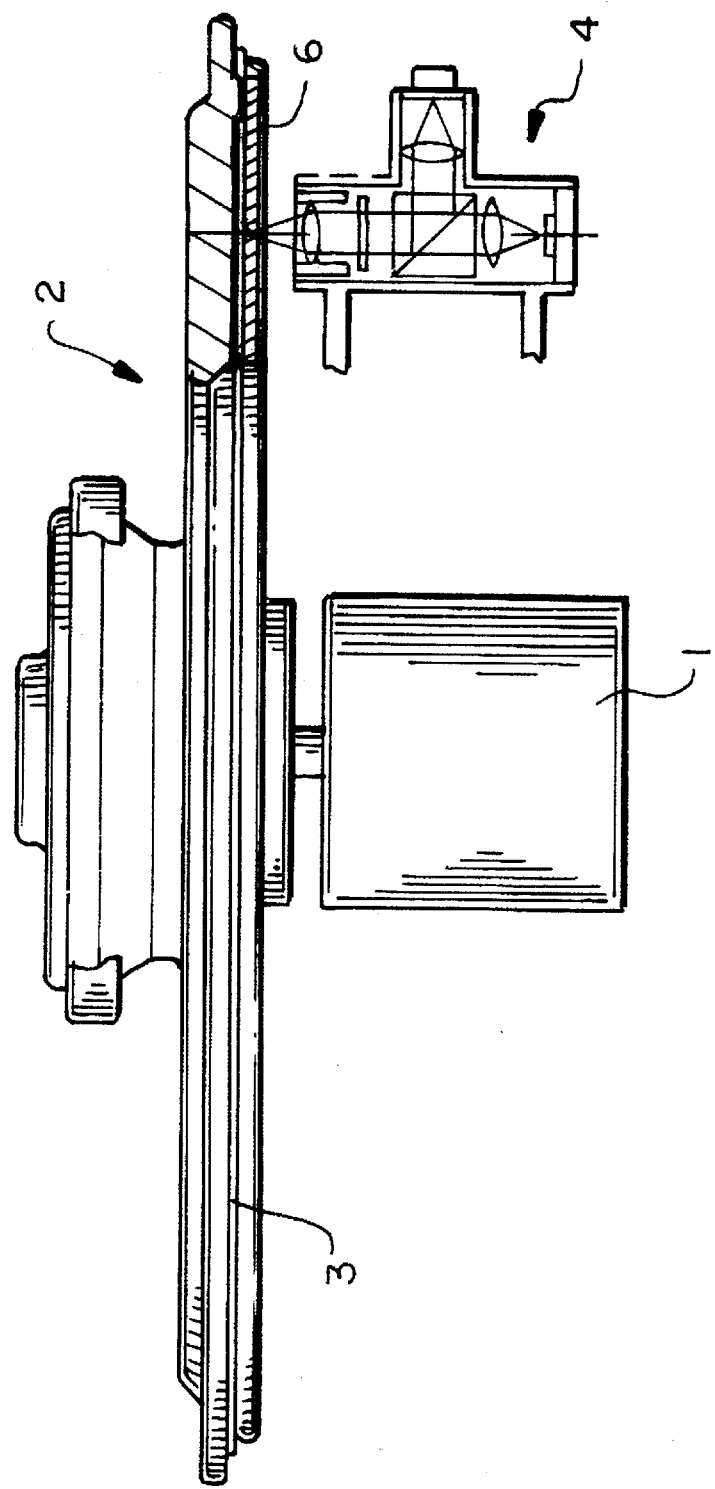
FIG. 2 shows a partly cut away lateral view of a first embodiment of an apparatus according to the invention.
Figure 2C:
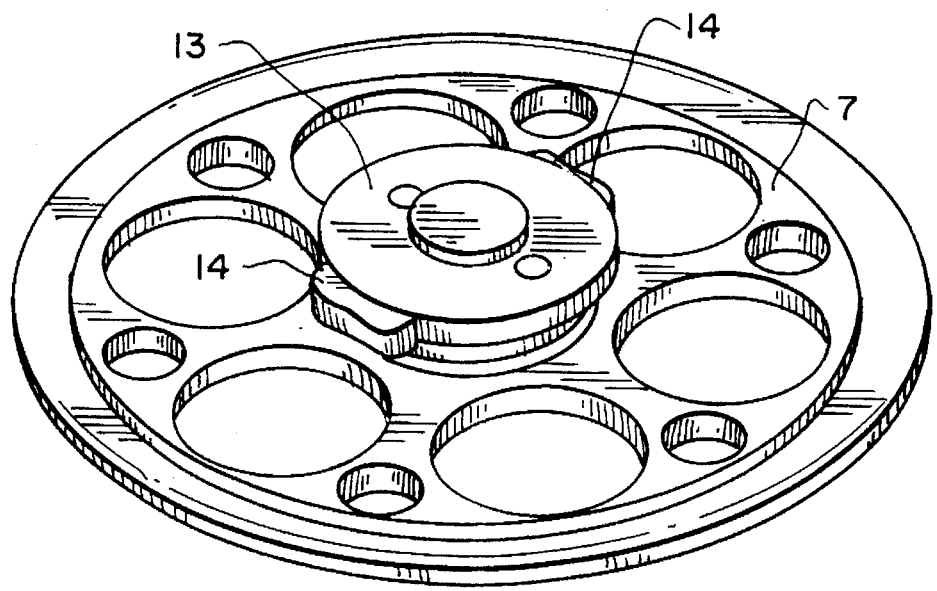
FIGS. 2c–2e show the main parts of an embodiment of an apparatus for testing matrixes according to the invention.
Figure 2D:
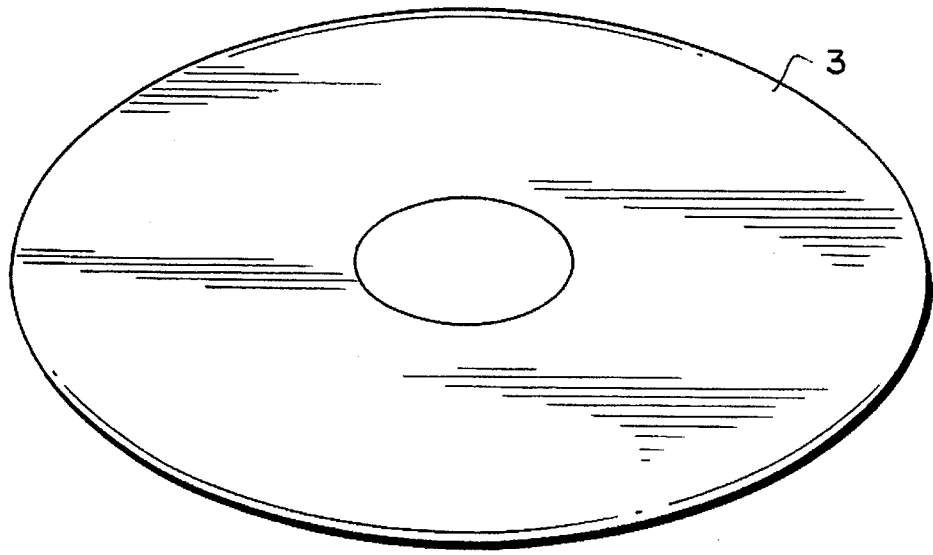
Figure 2E:
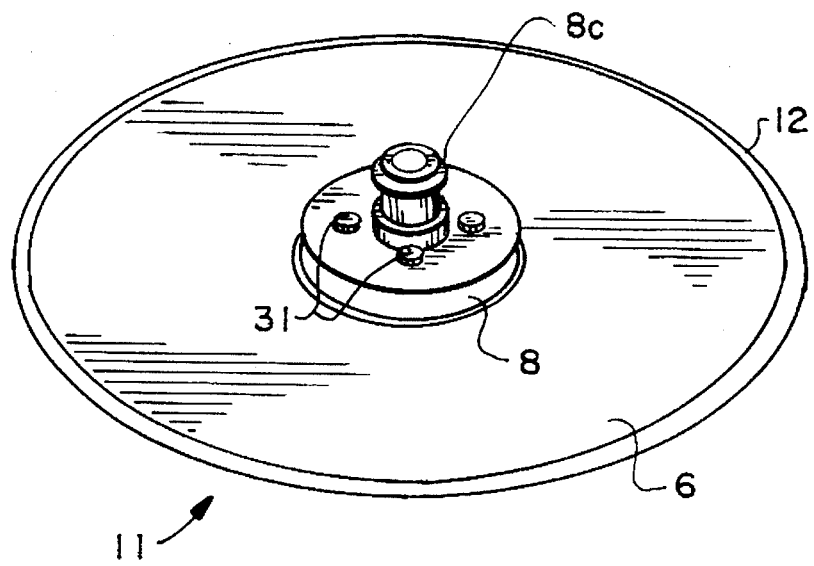

The embodiment of an apparatus according to the invention shown in FIG. 2 is also provided with a drive 1 and an opto-electronic sensing system 4. A holding device 2 holds the matrix 3. In the embodiment shown, according to the invention the holding device also includes a transparent cover 6 arranged between the matrix 3 and the sensing system 4, which is moved together with the holding device and the matrix 3. This rigid cover 6, advantageously configured as a flat plate, allows the desired adjustment of the optical path between the sensing system 4 and the matrix 3. Moreover, this cover 6 protects the sensitive matrix. The plate-like cover 6 is provided with a refractive index different to the refractive index of the air and is at least transparent to the light used in the opto-electronic sensing system, that is to say permeable.

In the embodiment shown in FIG. 2 the cover (plate 6) is firmly connected to the holding device 2 during the testing operation and—as it co-operates in the holding of the matrix 3 which is separate and removable from the cover 6—forms a part of this holding device. In this way the stable cover 6 can be used to hold sensitive, easily bent matrixes exactly in a flat position.

As shown in FIGS. 2a to 2e, in this case the holding device 2 for the matrix 3 is formed by a lower part 11 and an upper part 7 removably connected thereto. This allows easy placement and exchanging of the matrix 3.

In the embodiment shown the lower part 11 is composed substantially of three parts, namely the transparent cover 6 according to the invention and two holding parts 8 and 9 screwed together by means of screws 31, between which the plate 6 is held with its central hole clamped. By means of loosening the screws 31 the plate 6 can be exchanged when necessary. However, during normal use the lower part composed substantially of the plate 6 and the two holding parts 8 and 9 remains one unit. To assemble the device the matrix 3 is simply laid on the lower part 11 and then firmly compressed with the upper part 7 which is provided with a rapid fastener 13 with two press buttons 14 for rapidly releasable fastening which will be described in more detail later, which can be operated with one hand.

In order to prevent damage to the matrix due to pressure on the cover or plate 6, the matrix is held on its inner side and its outer side at a distance from the glass plate by means of the spacers 8a (projections on part 8) and 12.

The distance is ensured in the inner side by means of a spacer 8a made of metal or plastics, wherein this spacer tensions the matrix 3 in the area where the matrix will later be held in the injection moulding tool. In this way damage to the matrix which might later be visible is prevented. Furthermore, the cone 8b on the part 8 facilitates the mounting of the matrix 3 and ensures precise centring. The upper part 7 of the device (gripper) latches onto the central pin 8c of the part 8 and ensures the locking and sufficient pressure of the upper part 7 against the matrix 3 and the glass plate 6. The part 9 is configured as a counterpart to the drive 1, and ensures flat and central positioning of the sensor on the drive 1.

A further element 12 made of plastics or rubber ensures, as a spacer on the outer edge (a rubber seal, which is stuck on or fixed as a U-ring), distancing of the outer edge both upwards and downwards. Its also prevents damage by scratching, prevents damage to the underside of the (glass) plate 6 in case the device is set down carelessly and serves as the counterpart for the upper part 7 which forms the compression device for holding the matrix 3 flat. Furthermore, this element 12 serves as a reliable hermetic seal for the inner area (the data area with a radius 15 in FIG. 2) of the matrix 3 against dust or other contamination. This spacing element 12 lies just outside the area which is later visible on the end-product. Slight damage in this area on the surface of the matrix 3 by the upper part 7 therefore also cannot lead to visible defects in the end-product.

The spacer 12 is preferably composed of a soft elastic or elastic rubber material.

The upper part 7 is provided with downwardly projecting projections 7a and 7b which are arranged opposite the spacers 8a and 12 respectively, so that the matrix is simply held in a clamped manner between these projections 7a and 7b on the one hand and the spacers 8a, 12 on the other hand.

As already mentioned, at least the area of the matrix which contains the data (as far as the diameter 15 in FIG. 2) is hermetically sealed from the environment, wherein the data on the matrix 3 can still be initiated through the transparent cover 6. In this way excellent protection for the matrix is obtained. The spacer 12 thus also functions as a seal.

In addition, the external radius 16 of the (glass) plate 6 is approximately 5 mm larger than the information area (data area as far as radius 15) of the matrix. whereby visible damage to the matrix caused by pressure points is also eliminated. In the special case of the compact disc with a radius of 60 mm, the radius of the (glass) plate 6 is, for example, approximately 65 mm.

The radius 17 and thereby the outer edge of the matrix 3 is significantly larger than the data area of the matrix and also larger than the (glass) plate. This outer edge is not held but instead is free. In this way irregularities on the outermost edge of the matrix 3 such as cut or stamped edges or undulations do not affect the measurement results, as even in the injection moulding they have no substantial effect on the results.

The upper part 7 of the device presses the matrix innermost against the part 8a and outside against the soft element 12. Tensions within the matrix 3 therefore cannot lead to a significant non-planarity of the matrix during measurement.

The outermost edge of the upper part 7 protrudes over the maximum radius 17 of the matrix 3 (radius 18) and is rounded. This construction of the upper part 7 forms a "protective edge" and prevents the user from being injured by the sharp edge of the matrix 3. The free positioning of this protective edge also prevents the undulation of the matrix 3 on the outer edge from affecting the planarity in the information area. Further, this projecting edge of the upper part 7 protects edge of the (glass) plate from damage by inappropriate manipulation.

Figure 3C:
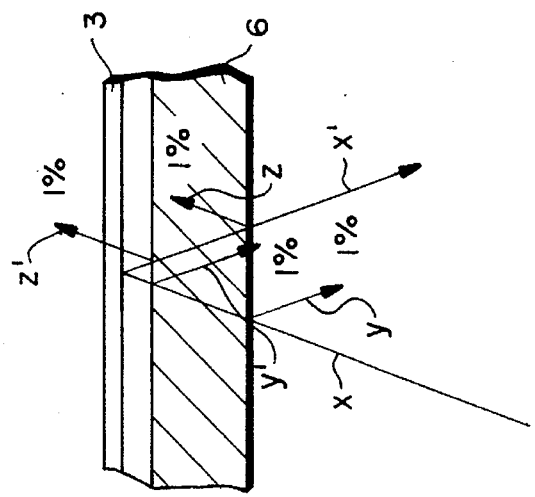
FIG. 3c shows the beam path during reflection off a matrix which is coated with anti-reflection coating.
Figure 3B:
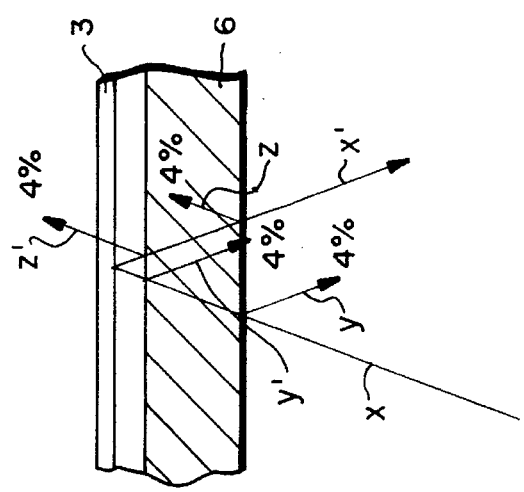
FIG. 3b shows the beam path during reflection off a matrix which is not coated with anti-reflection coating.
Figure 3A:
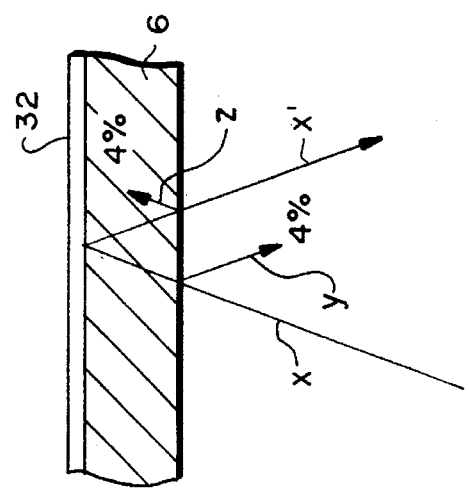
FIG. 3a shows the beam path during reflection off an optical storage medium.

The transparent plate 6 is anti-reflection coated on both sides in order to reduce the loss of laser light by means of the two additional transition surface passes. In the case of the optical medium 32 a twice-over loss occurs (once with the original beam x, as shown by arrow y, and once with the reflected beam x', as shown by arrow z) during the pass through the transition area, with a loss of approximately 2×4%=approximately 8% of power (FIG. 3a). During the measurement of matrixes 3 this loss occurs twice, as shown by arrows y'60 and z', on the underside of the transparent plate 6 and twice, as shown by arrows y and z, on the upper side (FIG. 3b). The power loss is therefore approximately 16%. This power loss can be reduced to approximately 4% by means of anti-reflective coating (FIG. 3c).

FIG. 4 again shows enlarged the area in which the matrix is held, namely between the projection 7a of the upper pan 7 and the spacer 8a of the lower part 11, on the inside of the matrix. On the outside of the matrix it is held between the projection 7b and the spacer 12. The gap between the parts which can be seen in the drawing is for reasons of clarity in the drawing. In practice, the matrix 3 is clamped between the upper part 7 and lower part 11, wherein the pans lie fully one on top of the other. In order to releasably connect the upper part 7 to the lower part 11, and therewith to clamp in the matrix 3, a one-handedly operable rapid fastener 13 is provided, which is provided with an operating press button 14. At the same time the upper part 7 is configured centrally so that it can easily grasped with the fingers and lifted up.

The gripper shown in FIG. 4 of the upper part 7 contains a press closure for operation with one hand. In the compressed state the upper part 7 can be removed from the lower part 11 with one hand. In the non-compressed state, the fastener 13 latches onto the lower part 11, and thereby connects the upper and lower pans 7, 11 and the matrix 3 lying in between them, and holds the matrix 3 flat. The press button 14 operates a ball 19 by means of a spring 20 as the latching element which engages with the inclined surface 8d. This embodiment allows very rapid and reliable mounting and de-mounting with one hand and can be used at the same time for placing the ready assembled device on the sensor.

Figure 5:
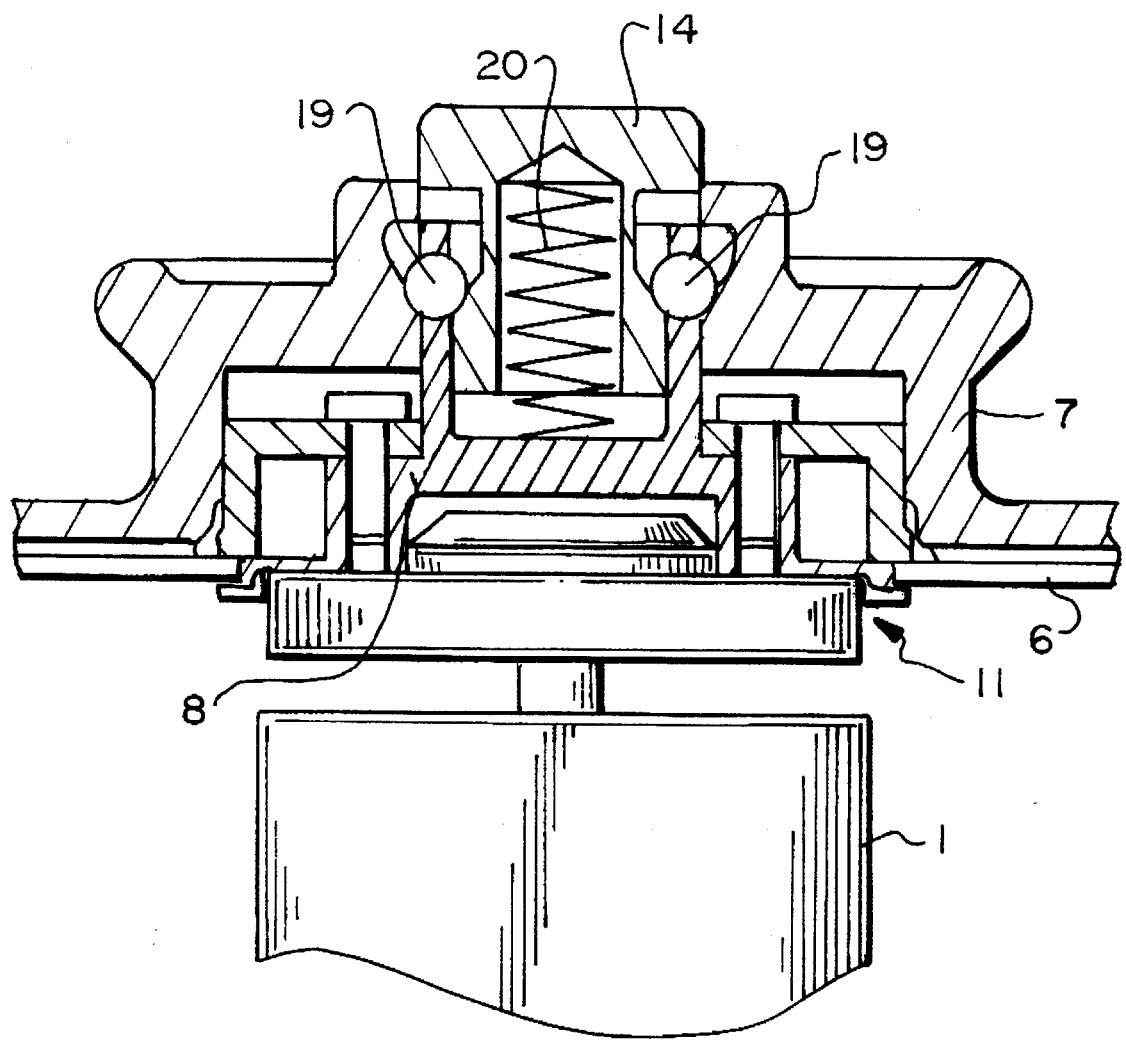
FIG. 5 shows an alternative one-handed rapid fastening system according to the invention.

In FIG. 5 an alternative embodiment of the one-handedly operable rapid fastener is shown, wherein the removal is done by pressing a central press button 14 which is loaded by a spring 20. When the press button 14 is not pressed the parts 7 and 8 are held together by the balls 19, which are supported outside and inside on inclined surfaces. When the press button 14 is pressed, the balls can yield. Lifting of the upper part 7 from the under pan 11 surrounding the pan 8 is possible.

The idea of a one-handedly operable rapid fastener can be employed particularly advantageously with the configuration according to the invention with an associated transparent cover. Essentially this idea of the rapid fastener can however be used with configurations without the associated transparent cover as is shown in FIG. 6.

In the embodiment shown in FIG. 6 the matrix 3 is held at its outer periphery between a ring 21 and latching elements 22 which seen from above extend outwards in a star shape. These latching elements 22 are mounted displaceably against the action of a spring 24 on pins 23. The springs 24 press the latching elements 22 radially outwards. By means of inclined surfaces 25 on the latching elements and inclined surfaces 26 on the ring 21, as a result of these radially outwardly directed components of force a clamping action is exerted on the matrix 3 which is thereby held. To release this connection firstly the entire device lying freely on the drive is removed and laid on a table. The latching elements are then pressed radially inwards with one hand 22 and in this way the inclined surface 25 unlatches and can be removed upwardly from the ring 21. The ring 21 then remains on the table with the matrix 3 lying in it. Assembly is carried out in reverse order.

Flatness is not necessary for the measurement of masters or matrixes made of glass. Because of this in such cases the gripper can be entirely omitted and the device gripped with a simplified configuration of the lower part, or else the gripper can be more simply configured (FIG. 7).

In cases where the matrix 3 does not have a central hole, it is laid freely on the glass plate 6, wherein the inward and outward distance is guaranteed by means of soft spacers (O-ring 12', U-profile 12). The matrix 3 is centred (FIG. 9) on the glass plate 6 by displacement by means of an external centring device 27 with a shield 28.

After this the lid 7' is mounted (FIG. 8). It is also possible, however, to mount the lid 7' on the uncentred matrix 3 and then to centre the lower part of the seat by means of positioning screws 29 (FIG. 10).

We claim:
1. Apparatus for testing matrixes for manufacturing optical storage media, with a rotatable holding device for holding a matrix and with an opto-electronic sensing system for reading data stored on the matrix, characterised in that between the matrix and the sensing system a cover configured as a rigid, transparent disk rotating together with the holding device and the matrix is provided, said cover being separate from said matrix and said matrix being held in a plane condition by said holding device and said cover.

2. Apparatus according to claim 1, characterised in that the cover is a self-supporting component separate from the matrix.

3. Apparatus according to claim 1, characterised in that the cover is made of glass.

4. Apparatus according to claim 1, characterised in that the cover is anti-reflection coated at least on one side.

5. Apparatus according to claim 1, characterised in that the cover is connected firmly to the holding device and holds the matrix flat.

6. Apparatus according to claim 1, characterised in that the holding device is provided with a lower part surrounding the transparent cover and an upper part releasably connected thereto, wherein the matrix is held between the upper part and lower part in a clamped manner.

7. Apparatus according to claim 6, characterised in that the upper part is provided with a handle.

8. Apparatus according to claim 1, characterised in that spacers are arranged between the matrix and cover, so that an area of the matrix containing data does not lie on the cover.

9. Apparatus according to claim 8, characterised in that at least one spacer, preferably annular when viewed from above, is arranged respectively radially inside and radially outside said area of the matrix containing data.

10. Apparatus according to claim 9, characterised in that at least one spacer is profiled with a U-Shaped cross-section and engages a free outer edge of said cover.

11. Apparatus according to claim 9, characterised in that at least one spacer is composed of soft elastic or elastic rubber material.

12. Apparatus according to claim 9, characterised in that at least one spacer is configured as a seal.

13. Apparatus according to claim 1, characterised in that said data stored on the matrix are arranged hermetically sealed from the environment in the holding device surrounding the cover, wherein said data stored on the matrix is readable through the transparent cover.

14. Apparatus according to claim 13, characterized in that at least one spacer is configured as a seal.

15. Apparatus according to claim 1 for matrixes without a central hole, characterised in that in the holding device is provided with a lower part with a plate-like transparent cover having spacers upon which the matrix is laid, wherein an upper part of said holding device mounted only by gravity is laid on the matrix to secure the matrix between the upper part and the lower part.

16. Apparatus for testing matrixes for manufacturing optical storage media, with a rotatable holding device for holding a matrix and with an opto-electronic sensing system for reading signals stored on the matrix, characterised in that the matrix is held between two parts of the holding device releasably connected to one another, wherein both of said two parts are connected to one another by means of a one-handedly operable rapid fastener.

17. Apparatus according to claim 16, characterised in that the rapid fastener is provided in at least one part of said two parts with a spring-tensioned, hand operable press button, which allows release of the two parts when said press button is in a pressed state.

18. Apparatus according to claim 17, characterised in that the press button is effectively linked to a latching element which when said two parts are assembled holds said two parts together in a clamped manner, and pressing of the press button unlatches the latching element.

19. Apparatus according to claim 16, characterised in that the rapid fastener is provided in a first part of said two parts, and is provided with at least one spring-tensioned latching element, which when said two parts are assembled holds said two parts together in a clamped manner by means of an inclined surface on a second part of said two parts.

20. Apparatus according to claim 19, characterized in that the press button is effectively linked to the latching element and pressing of the press button unlatches the latching element.

21. Apparatus according to claim 16, characterised in that the holding device surrounds a rigid, transparent cover for the matrix.

22. A process for aligning a matrix without a central hole on an apparatus for testing the matrix for manufacturing optical storage media, said apparatus for testing the matrix comprising; an opto-electronic sensing system for reading data stored on the matrix, a rotatable holding device having a lower part and an upper part between which said matrix is held, said lower part being positioned between the matrix and the sensing system, said lower part including a plate-like transparent cover having spacers thereon for supporting the matrix, said cover being configured as a disk rotating together with the holding device and the matrix, said cover being separate from said matrix and said matrix being held in a plane condition by said holding device and said cover, wherein said upper part of said holding device is laid on said matrix and mounted to said lower part only by gravity, said process comprising:

pushing, by hand, the matrix onto the lower part while observing data tracks on said matrix enlarged on a screen; and mounting said upper part to said lower part when said data tracks run centrically on said screen.

23. A process for aligning a matrix without a central hole on an apparatus for testing the matrix for manufacturing optical storage media, said apparatus for testing the matrix comprising; an opto-electronic sensing system for reading data stored on the matrix, a rotatable holding device having a lower part and an upper part between which said matrix is held, said lower part being positioned between the matrix and the sensing system, said lower part including a plate-like transparent cover having spacers thereon for supporting the matrix, said cover being configured as a disk rotating together with the holding device and the matrix, said cover being separate from said matrix and said matrix being held in a plane condition by said holding device and said cover, wherein said upper part of said holding device is laid on said matrix and mounted to said lower part only by gravity, said process comprising:

laying said matrix on said lower part, by hand, in a roughly centered position;

mounting said upper part to said lower part; and aligning said lower part in two spatial directions perpendicularly with respect to an axis of rotation of said holding device until said matrix is centered in said holding device.

* * * * *

UNITED STATES PATENT AND TRADEMARK OFFICE

CERTIFICATE OF CORRECTION

Patent No.: 5,579,113

Issued: November 26, 1996

Inventor(s): Papst et al.

Figure 9:
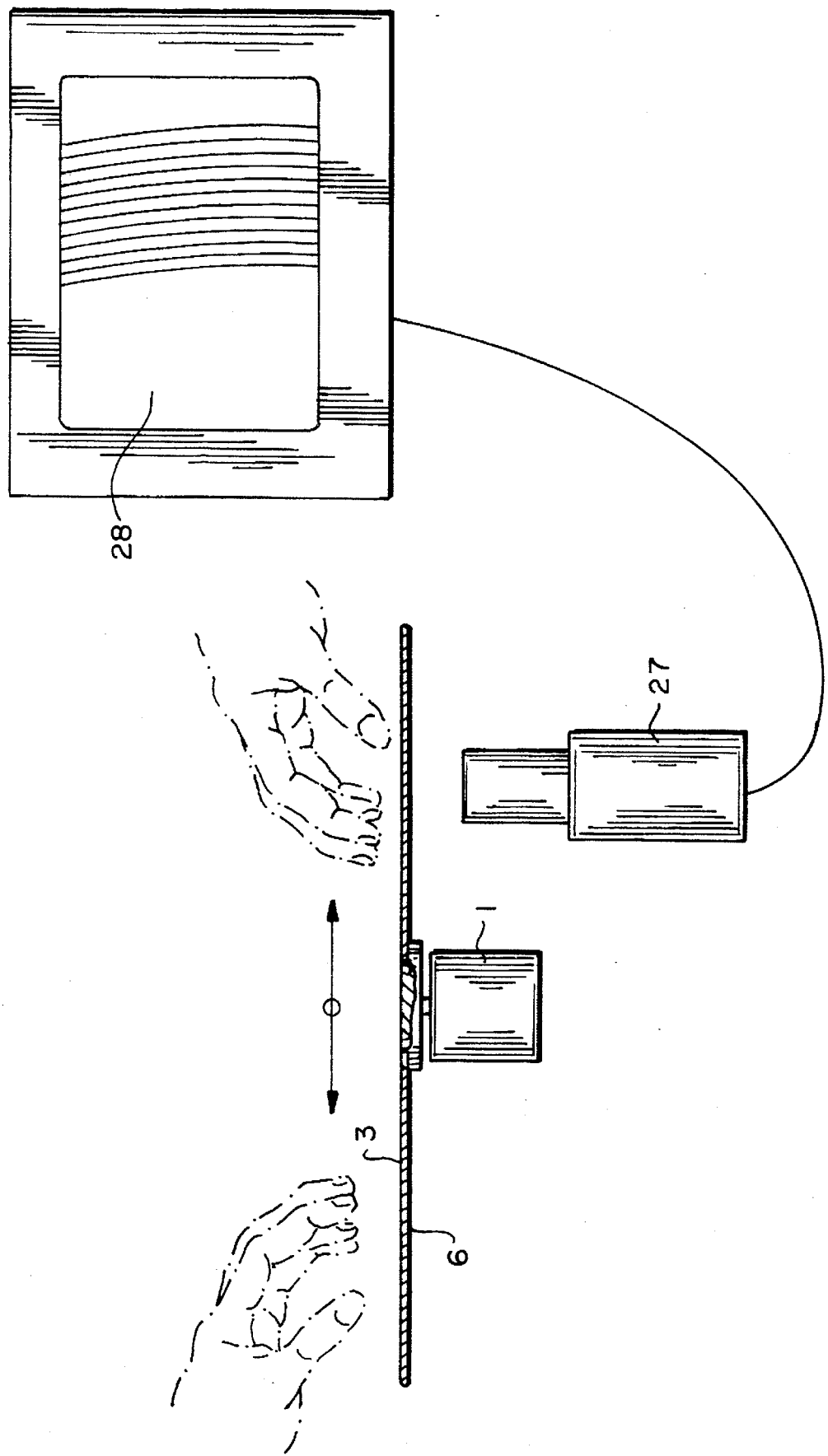
FIG. 9 shows schematically the alignment of the matrix on the lower part and the cover of the holding device according to the invention.

It is certified that error appears in the above-identified patent and that said Letters Patent is hereby corrected as shown below:

Column 3, Line 36: Delete "FIG. 4" and insert -- FIG. 4a" -- therefor;

Column 3, Line 39: Before "FIG. 5 shows an alternative", insert -- FIG. 4b shows a first enlarged section of FIG. 4a. FIG. 4c shows a second enlarged section of FIG. 4a. --;

Column 3, Line 41: Delete "FIG. 6" and insert -- FIG. 6a -- therefor;

Column 3, Line 44: Before "FIG. 7 shows a further" insert -- FIG. 6b shows an enlarged section of FIG. 6a. --;

Column 3, Line 44: Delete "FIG. 7" and insert -- FIG. 7a -- therefor;

Column 3, Line 46: Before "FIG. 8 shows a section" insert -- FIG. 7b shows an enlarged section of FIG. 7a. --;

Column 3, Line 46: Delete "FIG. 8" and insert -- FIG. 8a -- therefor;

Column 3, Line 49: Before "FIG. 9 shows schematically" insert -- FIG. 8b shows a first enlarged section of FIG. 8a. FIG. 8c shows a second enlarged section of FIG. 8a. --;

Column 3, Line 52: Delete "FIG. 10 shows" and insert -- FIG. 10a shows a side sectional view of -- therefor;

Column 3, Line 55: Insert -- FIG. 10b shows a top view of the matrix shown in FIG. 10a. --;

UNITED STATES PATENT AND TRADEMARK OFFICE
CERTIFICATE OF CORRECTION

Patent No.: 5,579,113

Issued: November 26, 1996

Inventor(s): Papst et al.

It is certified that error appears in the above-identified patent and that said Letters Patent is hereby corrected as shown below:

Column 5, Line 19: Delete "matrix." and insert -- matrix, -- therefor;

Column 5, Line 54: Delete "60";

Column 5, Line 60: Delete "pan" and insert -- part -- therefor;

Column 6, Line 10: Delete "pans" and insert -- parts -- therefor;

Column 6, Line 24: Delete "pan 11 surrounding the pan 8" and insert -- part 11 surrounding the part 8 -- therefor.

Signed and Sealed this

Sixth Day of May, 1997

Attest:

BRUCE LEHMAN

Attesting Officer

Commissioner of Patents and Trademarks